(12) United States Patent
Ishiwata et al.

(10) Patent No.: US 8,298,316 B2
(45) Date of Patent: Oct. 30, 2012

(54) METHOD FOR PRODUCING PIG IRON

(75) Inventors: Natsuo Ishiwata, Tokyo (JP); Hiroyuki Hiroha, Tokyo (JP); Koichi Nushiro, Tokyo (JP); Atsushi Sakai, Tokyo (JP)

(73) Assignee: JFE Steel Corporation (JP)

( * ) Notice: Subject to any disclaimer, the term of this patent is extended or adjusted under 35 U.S.C. 154(b) by 93 days.

(21) Appl. No.: 12/988,862

(22) PCT Filed: May 27, 2009

(86) PCT No.: PCT/JP2009/060101
§ 371 (c)(1),
(2), (4) Date: Oct. 21, 2010

(87) PCT Pub. No.: WO2009/145348
PCT Pub. Date: Dec. 3, 2009

(65) Prior Publication Data
US 2011/0041652 A1 Feb. 24, 2011

(30) Foreign Application Priority Data

May 30, 2008 (JP) .................................. 2008-141981

(51) Int. Cl.
C21B 5/06 (2006.01)
C22B 7/02 (2006.01)
C22B 19/04 (2006.01)

(52) U.S. Cl. ................ 75/459; 75/468; 75/472; 75/656; 75/961; 423/99

(58) Field of Classification Search .................... 75/459, 75/472, 468, 656, 961; 423/99
See application file for complete search history.

(56) References Cited

U.S. PATENT DOCUMENTS

| 2,836,487 | A | * | 5/1958 | Fastje et al. | ..................... 75/468 |
| 4,213,778 | A | * | 7/1980 | Sitz | ............................... 75/472 |
| 5,540,751 | A | * | 7/1996 | Yamamoto et al. | ............ 75/376 |
| 6,302,938 | B1 | * | 10/2001 | Kamijo et al. | ................. 75/316 |

FOREIGN PATENT DOCUMENTS

| JP | 64-65212 | 10/1989 |
| JP | 3-062772 | 9/1991 |
| JP | 11-241125 | 9/1999 |
| JP | 2005-89794 | 4/2005 |

OTHER PUBLICATIONS

Ryukichi Hashiguchi, "Kinzoku Kogaku Koza 4 Sciren Hen III Seisen-Seiko", 14th edition, Asakura Shoten, Mar. 30, 1969, pp. 84-88, with Brief English Description.

* cited by examiner

*Primary Examiner* — George Wyszomierski
*Assistant Examiner* — Tima M McGuthry Banks
(74) *Attorney, Agent, or Firm* — DLA Piper LLP (US)

(57) ABSTRACT

In a method for producing pig iron using iron ore with a high content of zinc, a blast furnace raw material 2 is produced using iron ore with a high content of zinc which contains 0.01 mass % or more of zinc and 50 mass % or more of iron, pig iron is produced by charging the blast furnace raw material 2 into a blast furnace 1 and, at the same time, zinc-containing dust 4 in a blast furnace discharge gas is recovered, and zinc 6 is recovered from the zinc-containing dust 4 using a reduction furnace 5. A mixed raw material into which the zinc-containing dust 4, a carbonaceous solid reducing material and a slag-making material are mixed is preferably charged on a movable hearth, and the mixed raw material is preferably reduced by supplying heat from an upper portion of the movable hearth so as to recover zinc 6 while producing reduced iron 7.

16 Claims, 3 Drawing Sheets

[FIG.1]
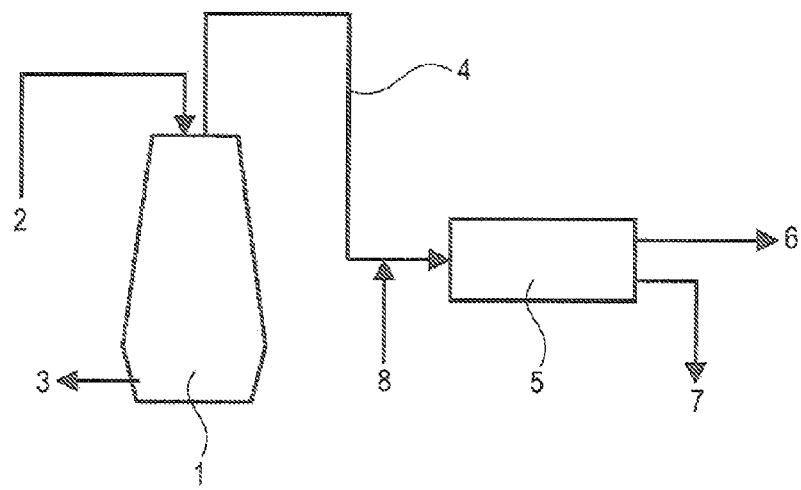
[FIG.2]
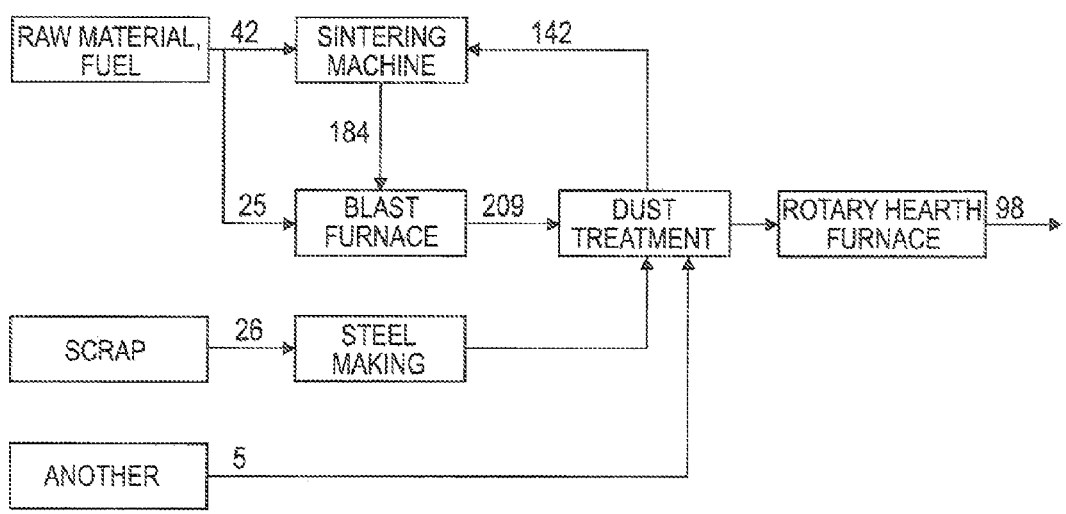

[FIG.3]
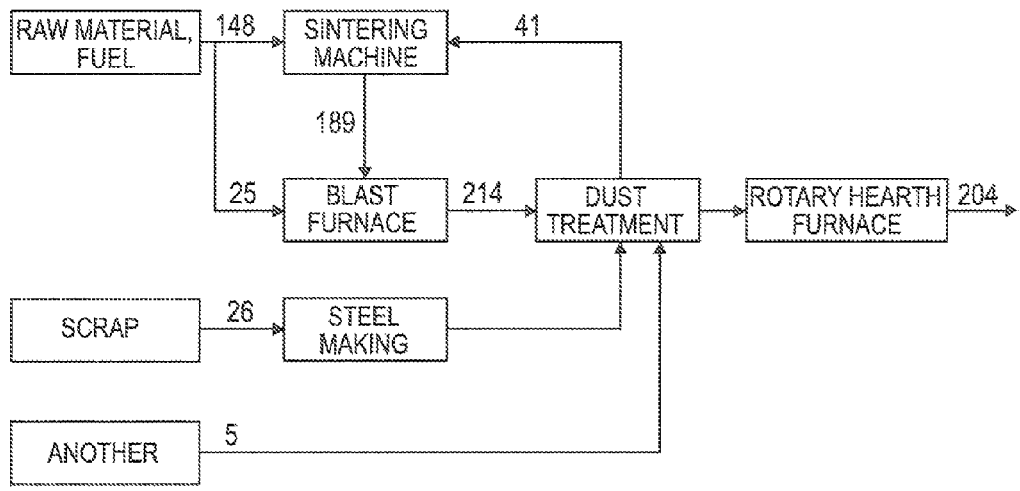
[FIG.4]
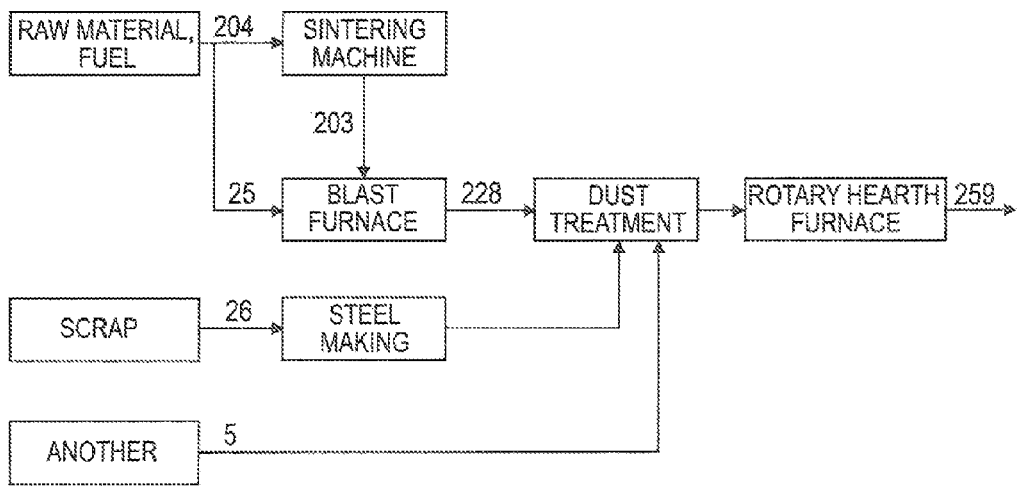

[FIG.5]
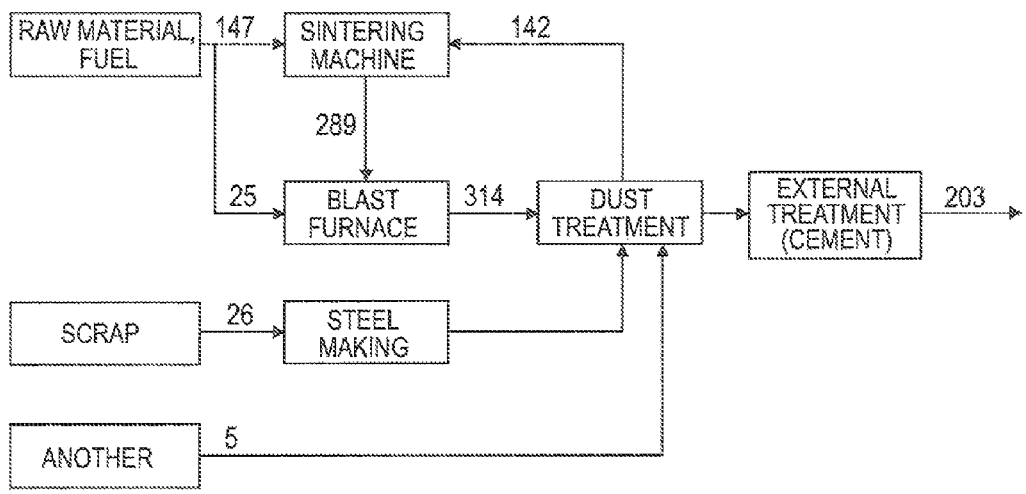

METHOD FOR PRODUCING PIG IRON

RELATED APPLICATIONS

This is a §371 of International Application No. PCT/JP2009/060101, with an international filing date of May 27, 2009, which is based on Japanese Patent Application Nos. 2008-141981 filed May 30, 2008 and 2009-129830, filed May 29, 2009, the subject matter of which is incorporated by reference.

TECHNICAL FIELD

This disclosure relates to a method for producing pig iron from iron ore with a high content of zinc.

BACKGROUND

Crude steel producing methods are roughly classified into a blast-furnace-converter method which produces pig iron from iron ore and refines the pig iron into steel, and an electric furnace method which melts scrap and refines the molten scrap into steel. With the advent of newly industrialized countries including China, the crude steel production quantity has been rapidly increasing on a worldwide basis. Particularly, the supply and demand of iron ore used in the blast-furnace-converter method is tight. Hence, the cost of iron ore is increasing and, at the same time, it is becoming more and more difficult to obtain high-quality iron ore.

In a usual blast furnace operation, zinc which is contained in a charging raw material and is charged into a blast furnace is reduced and evaporated in the furnace, and a part of the zinc is discharged to the outside of the furnace as dust contained in a discharge gas. However, a part of the zinc is oxidized and coagulated as oxide in a part of the furnace where the temperature is low and oxidization potential is high. Zinc oxide is particularly liable to be coagulated on an inner wall of a shaft of the blast furnace thus making coke or ore around the coagulated zinc oxide adhere to each other thus immobilizing a filling material. Such an immobilized portion is referred to as "Ansatz". "Ansatz" makes the descending of the furnace filling material unstable thus inducing troubles such as "bridging" or "slip".

Further, in general, zinc-containing dust in a blast-furnace discharge gas which contains a large quantity of iron content is recycled in a sintering process together with other steel-making-plant generated dust. To prevent the occurrence of the above-mentioned drawback attributed to the increase of an amount of zinc charged into the blast furnace, there has been proposed a method for processing dust in which zinc-containing dust is separated into low zinc dust and high zinc dust based on a content of zinc, the low zinc dust is used as a sintering raw material, and the high zinc dust is used as a cement manufacturing raw material (see JP-B-3-62772, for example). Even the process disclosed in JP-B-3-62772 is performed, currently, the amount of zinc charged into a blast furnace from a charging raw material is around an upper limit allowable in a blast furnace operation. The use of iron ore with a high content of zinc as a raw material charged into a blast furnace under such a circumstance increases an amount of zinc charged into the blast furnace. Hence, the use of the iron ore under such a circumstance is difficult.

On the other hand, demand for zinc is rapidly increasing on a worldwide basis in the same manner as iron ore thus giving rise to a drawback that the cost of zinc is increasing. Zinc also has a drawback that a zinc raw material such as sulfide mineral or zinc oxide is in short supply. Zinc is an indispensable metal as a battery raw material, or as a plating material which enhances corrosion resistance of a surface of a steel sheet or the like, for example. Zinc metal is generally produced such that zinc oxide is prepared by oxidizing and roasting sulfide mineral, and zinc oxide is refined by a wet refining method or a dry refining method. Recently, there has been also proposed a method in which crude zinc oxide is prepared by refining iron-making process dust, and crude zinc oxide is used as a zinc refining raw material.

For example, in the case of crude zinc oxide with a zinc concentration exceeding 10 mass %, crude zinc oxide of high concentration can be prepared by applying an intermediate treatment such as a Waelz method or the like, and such crude zinc oxide can be used as a zinc refining raw material. Further, in the case of crude zinc oxide with a zinc concentration exceeding 50 mass %, such crude zinc oxide can be directly used as crude zinc oxide used in zinc refining such as an ISP method or the like, for example.

Under the above-mentioned circumstance where the problem that resources such as the iron raw material and the zinc raw material are in short supply, iron ore which contains zinc larger than a usual content cannot be currently used in a blast furnace so that iron content and zinc content of the iron ore are not effectively utilized.

It could therefore be helpful to provide a method for producing pig iron using iron ore with a high content of zinc which can effectively make use of iron ore with a high content of zinc.

It could therefore be helpful to provide a method for producing pig iron using iron ore with a high content of zinc which can overcome the shortage of supply of both zinc and iron.

SUMMARY

We thus provide a method for producing pig iron which includes: a blast furnace raw material producing step; a pig iron producing step; a dust recovering step; and a zinc recovering step.

The blast furnace raw material producing step comprises producing a blast furnace raw material using iron ore with a high content of zinc which contains 0.01 mass % or more of zinc and 50 mass % or more of iron.

The pig iron producing step comprises producing pig iron by charging the blast furnace raw material into a blast furnace, and discharging a blast furnace discharge gas which contains zinc-containing dust from a furnace top.

The dust recovering step comprises recovering zinc-containing dust in the blast furnace discharge gas.

The zinc recovering step comprises recovering zinc from the zinc-containing dust using a reduction furnace.

The iron ore with a high content of zinc may preferably contain 0.01 to 0.5 mass % of zinc and 50 to 70 mass % of iron.

The blast furnace raw material may preferably be at least one selected from the group consisting of sintered ore, pellets, lump ore, carbon containing agglomerated ore and ferrocoke. The blast furnace raw material may preferably be the sintered ore.

It is preferable that the blast furnace raw material producing step comprises producing the blast furnace raw material using the iron ore with a high content of zinc which contains 0.01 mass % or more of zinc and 50 mass % or more of iron and the zinc-containing dust.

It is preferable that the pig iron producing step comprises producing the pig iron by charging the blast furnace raw material which has a blast furnace charging zinc amount of 250 g or less per 1 ton of pig iron into the blast furnace. The blast furnace charging zinc amount may preferably be 60 to 250 g per 1 ton of pig iron.

The reduction furnace may desirably be one selected from the group consisting of a rotary kiln, a shaft kiln and a movable hearth furnace.

It is desirable that the zinc recovering step comprises charging the zinc-containing dust on a hearth of the movable hearth furnace, and reducing the zinc-containing dust by supplying heat from an upper portion of the hearth so as to recover zinc while producing reduced iron. In this case, the zinc-containing dust may preferably exhibit an average zinc concentration of 0.45 mass % or more.

It is preferable that the zinc recovering step comprises charging a mixed raw material which contains zinc-containing dust and a zinc-containing fine of steel byproduct on a hearth of a movable hearth furnace, and reducing the mixed raw material by supplying heat from an upper portion of the hearth to recover crude zinc oxide while producing reduced iron. The zinc-containing fine of steel byproduct may desirably be at least one selected from the group consisting of dust generated from a blast furnace, dust generated in a converter, dust generated in an electric furnace, and sludge generated in a surface treatment step.

It is preferable that the zinc recovering step comprises charging a mixed raw material into which zinc-containing dust, a carbonaceous solid reducing material, and a slag-making material are mixed on a movable hearth, and reducing the mixed raw material by supplying heat from an upper portion of the movable hearth so as to recover zinc while producing reduced iron. In this case, the mixed raw material may preferably exhibit an average zinc concentration of 0.45 mass % or more.

It is preferable that the zinc recovering step comprises charging a mixed raw material which contains zinc-containing dust, a carbonaceous solid reducing material, and a slag-making material and a zinc-containing fine of steel byproduct on a hearth of a movable hearth furnace, on a hearth of a movable hearth furnace, and reducing the mixed raw material by supplying heat from an upper portion of the hearth so as to recover crude zinc oxide while producing reduced iron. The zinc-containing fine of steel byproduct may desirably be at least one selected from a group consisting of dust generated in a blast furnace, dust generated in a converter, dust generated in an electric furnace, and sludge generated in a surface treatment step of steel plate.

BRIEF DESCRIPTION OF THE DRAWINGS

FIG. 1 is a schematic view showing a method for producing pig iron.
FIG. 2 is a flow chart showing a flow of zinc under a condition 1.
FIG. 3 is a flow chart showing a flow of zinc under a condition 5.
FIG. 4 is a flow chart showing a flow of zinc under a condition 8.
FIG. 5 is a flow chart showing a flow of zinc under a condition 11.

EXPLANATION OF SYMBOLS

1: blast furnace
2: blast furnace raw material
3: pig iron
4: zinc-containing dust (blast furnace discharge dust)
5: reduction furnace (rotary hearth furnace)
6: crude zinc oxide
7: reduced iron (iron pebble)
8: zinc-containing fine of steel byproduct

DETAILED DESCRIPTION

To use iron ore with a high content of zinc and also to effectively make use of contained iron and contained zinc, we discovered the idea of recovering zinc from zinc-containing dust in a blast furnace discharge gas which has been conventionally used for recycled use in a sintering step or as a cement raw material by using the iron ore with a high content of zinc as a blast furnace raw material such as sintered ore.

Iron ore with a high content of zinc is iron ore which exhibits high zinc content compared to iron ore used as a normal blast furnace raw material, and contains not less than 0.01 mass % of zinc and not less than 50 mass % of iron in general. Although there is no upper limit with respect to zinc content and iron content in iron ore with a high content of zinc, the upper limit of zinc content and iron content is naturally determined because iron ore with a high content of zinc is an iron ore. The upper limit of zinc content is approximately 0.5 mass % or less, for example, while the upper limit of iron content is approximately 70 mass % or less, for example. Further, content of alkali component such as $Na_2O$ or $K_2O$ in iron ore with a high content of zinc is usually 0.08 mass % or more in terms of oxide. It is preferable to set the content of alkali component to not more than 1 mass %. With such content of alkali component, it is possible to effectively and preliminarily prevent low-temperature reduction degradation of sintered ore.

It is desirable to use sintered ore, pellets, lump ore, carbon containing agglomerated ore, ferrocoke or the like as the blast furnace raw material which uses iron ore with a high content of zinc.

As a method for recovering zinc from the zinc containing dust in the blast furnace discharge gas, for example, zinc concentration treatment is applied to the zinc containing dust using a reduction furnace thus producing the crude zinc oxide, and zinc metal can be produced from crude zinc oxide by wet refining or dry refining. As the reduction furnace used here, a rotary kiln, a shaft kiln, a movable hearth furnace or the like may be named. Zinc is more concentrated in dust generated by the reduction furnace compared to dust discharged from a blast furnace and hence, it is effective to recover dust generated by the reduction furnace and to use the recovered dust as a raw material for crude zinc oxide. Further, it is preferable to recover iron content in dust simultaneously with the recovering of dust.

It is preferable to use a movable hearth furnace as the reduction furnace. When the movable hearth furnace is used as the reduction furnace, zinc-containing dust is charged on a hearth which moves in the horizontal direction, zinc-containing dust is reduced by heating zinc-containing dust with the transfer of the radiation heat from above, and reduced iron can be also produced on the hearth simultaneously. Alternatively, a mixed raw material produced by mixing zinc containing dust, a carbonaceous solid reducing material, and a slag-making material is charged on a hearth which moves in the horizontal direction, zinc-containing dust is reduced by heating the mixed raw material with the transfer of radiation heat from above, and reduced iron can be also produced on the hearth simultaneously. Further, by melting the reduced product on the hearth and by separating slag and metal from each other, it is possible to produce reduced iron as iron pebble. When the movable hearth furnace is used, reduced iron can be produced and, at the same time, zinc can be recovered from dust contained in a discharge gas generated by a movable hearth furnace. As the slag-making material and the carbonaceous solid reducing material, it is preferable to use limestone, silica sand, dust other than blast furnace dust, sludge, a carbonaceous material such as coke fine or the like.

The movable hearth furnace is a furnace which applies heating in a step of moving the hearth of a heating furnace horizontally, and the hearth which moves horizontally has the rotary movable configuration typically, and a movable hearth furnace having such configuration is particularly referred to as a rotary hearth furnace.

Hereinafter, our methods are explained with respect to a case where pig iron is produced using iron ore with a high content of zinc, and zinc is recovered using a rotary hearth furnace.

One example is explained in conjunction with FIG. 1. A blast furnace raw material 2 and a solid fuel are charged into a blast furnace 1 from a top of the blast furnace 1 using a furnace top charging device. Sintered ore is mainly used as the blast furnace raw material 2. Besides the sintered ore, pellets, lump ore, carbon containing agglomerated ore, ferrocoke or the like can be used as the blast furnace raw material 2.

With respect to the blast furnace raw material, iron ore with a high content of zinc which contains not less than 0.01 mass % of zinc and not less than 50 mass % of iron is used as such a raw material. From a viewpoint of recovering zinc, the larger a quantity of zinc charged into a blast furnace, the larger an amount of zinc which can be recovered becomes. However, to prevent worsening of a furnace operation due to materials adhered to the inside of the furnace, it is desirable to prepare a blast furnace raw material by adjusting a use quantity of iron ore with a high content of zinc such that the amount of zinc charged into the blast furnace becomes not more than a predetermined value and to charge the prepared blast furnace raw material into the blast furnace. Although the predetermined value may be set empirically for every blast furnace, the predetermined value may be set to not more than 250 g per 1 ton of pig iron, for example. It is possible to use zinc containing dust in a blast furnace discharge gas as a blast furnace charging raw material together with iron ore with a high content of zinc so long as a quantity of charged zinc does not exceed the predetermined value.

The charged blast furnace raw material 2 is reduced and melted in the blast furnace 1 so that pig iron 3 is produced.

Further, dust 4 is discharged from a top of the blast furnace together with a discharge gas, and this dust 4 contains iron and zinc. The zinc containing dust 4 is reduced in the rotary hearth furnace 5, zinc is vaporized and thereafter re-oxidized, and crude zinc oxide 6 is recovered as dust contained in a discharge gas generated in the rotary hearth furnace. In the dust which is contained in the discharge gas generated in the rotary hearth furnace, zinc is concentrated and hence, the dust is used as a raw material for zinc refining by directly refining the dust or by making the dust subject to a re-refining step. Further, iron component in the dust is recovered as reduced iron 7.

The zinc containing dust 4 contains other slag components besides iron and zinc. Further, coal, coal char or coke which is a typical example of a carbonaceous solid reducing material contains a slag component which is an ash component. Accordingly, in a rotary kiln method or a movable hearth furnace method where only a reducing operation is performed, the mixing of the slag component in reduced iron which is a finished product is unavoidable. By reducing and melting the raw material on the hearth of the rotary hearth furnace, it is possible to readily separate metal produced by reduction and slag which is a residue from each other and hence, it is possible obtain iron pebble which constitutes reduced iron of high density as a product.

A heating temperature at the time of reducing and melting dust using the rotary hearth furnace is preferably set to 1450° C. or more. By setting a maximum temperature in the rotary hearth furnace to 1450° C. or more, the inside of the furnace and the raw material which is reduced and melted in the furnace arrive at a high temperature. Particularly, by setting the temperature of the raw material in a molten state to 1450° C. or more, the raw material can ensure sufficient fluidity so that a gangue component in metal iron can be easily removed thus realizing the production of iron pebble having favorable properties.

By charging a carbonaceous material on the hearth and by stacking the mixed raw material containing dust on the carbonaceous material, it is possible to prevent the metal or slag in a molten state from eroding the refractories of the hearth. Since the iron component is taken in the refractories when the refractories are eroded, it is possible to reduce loss of the iron component by preventing the erosion of the refractories of the hearth thus contributing to the enhancement of productivity of iron pebble.

Although the method relates to a technique to produce pig iron using iron ore with a high content of zinc, it is possible to use iron ore with a high content of zinc by mixing a zinc-containing fine of steel byproduct 8 into iron ore with a high content of zinc at the time of reducing the zinc containing dust in the rotary hearth furnace. By mixing the zinc-containing fine of steel byproduct which exhibits higher zinc concentration than the zinc containing dust, in the dust recovered from the discharge gas generated by the rotary hearth furnace described above, it is possible to obtain dust containing crude zinc oxide at high concentration.

As described previously, although the recovered dust which contains crude zinc oxide differs in application field depending on zinc concentration, the zinc concentration in the recovered dust which is produced by the above-mentioned method exceeds 10 mass % and hence, it is possible to form the recovered dust into crude zinc oxide of high concentration by an intermediate treatment such as a Waelz method, and crude zinc oxide can be used as a zinc refining raw material.

Although a zinc-containing steel powder byproduct which is used in a mixed form with the zinc containing dust is not limited particularly, a byproduct generated in steel making industry such as dust generated in a blast furnace, dust generated in a converter, dust generated in an electric furnace or sludge generated in a surface treatment step of steel plate can be used, for example.

Provided that the average zinc concentration in the mixed raw material is 0.45 mass % or more, it is possible to set the zinc concentration in the recovered dust obtained by treating the mixed raw material in the rotary hearth furnace to 50 mass % or more. When the zinc concentration in the obtained recovered dust is 50 mass % or more, the intermediate treatment becomes unnecessary so that the recovered dust can be directly used as crude zinc oxide which is used in zinc refining. Accordingly, it is preferable to set the zinc concentration in the obtained recovered dust to 50 mass % or more.

As described above, by using the zinc-containing steel powder byproduct in a mixed form with the zinc containing dust at the time of reducing the zinc containing dust in the rotary hearth furnace, the zinc concentration in the recovered dust is enhanced thus also bringing about the enhancement of economy.

EXAMPLE 1

To confirm the validity of our methods, sintered ore is produced using iron ore with a high content of zinc and usual ore, and an example of producing pig iron is carried out using the facility shown in FIG. 1. A blast furnace which is served for the example is a large-sized blast furnace of 5000 m³ class. A blast condition of a blast furnace is shown in Table 1 and a ratio of a charging raw material (iron ore) to be charged into the blast furnace is shown in Table 2.

TABLE 1

| | |
|---|---|
| blast temperature (° C.) | 1100 to 1200 |
| blast quantity (Nm³/h) | 8000 to 8400 |
| moisture (g/Nm³) | 30 to 35 |
| oxygen enrichment (vol %) | 2.5 to 3.5 |

TABLE 2

| | (mass %) |
|---|---|
| sintered ore | 72.2 |
| lump ore | 23.9 |
| pellets | 3.9 |

The composition of ore A (ore with a high content of zinc) used as the raw material of sintered ore and the composition of blended iron ore for sintering (usual ore) are shown in Table 3. In Table 3, T-Fe implies total Fe.

TABLE 3

| | | | | | (mass %) |
|---|---|---|---|---|---|
| | T-Fe | FeO | SiO$_2$ | Al$_2$O$_3$ | Zn |
| ore A | 63.0 | 23.2 | 4.3 | 1.1 | 0.050 |
| blended ore for sintering | 58.2 | 1.5 | 4.6 | 1.8 | 0.005 |

Ore A is iron ore with a high content of zinc, and zinc concentration of the ore A is approximately 10 times as high as zinc concentration of blended iron ore for sintering which exhibits low zinc content. These ores are used as sintering raw materials at rates shown in Table 4, the produced sintered ores are charged into the blast furnace, and a furnace operation is performed under conditions 1 to 11.

TABLE 4

| | ratio of ore A in sintering raw material ore (mass %) | ratio of recycled dust (for sintering raw material ore) (mass %) | zinc content in sintering ore (mass %) | quantity of zinc charged into blast furnace g/t-p | blast furnace operation state | blast furnace discharge dust treatment method | zinc concentration in reduction furnace dust mass % | recovered zinc content g/t-p | iron recovery ratio mass % | remarks |
|---|---|---|---|---|---|---|---|---|---|---|
| condition 1 | 1 | 4.4 | 0.016 | 209 | substantially no problem | low Zn dust recycled as sintered ore and high Zn dust fed to reduction furnace | 50 | 98 | 97 | example |
| condition 2 | 1 | 0 | 0.004 | 67 | substantially no problem | reduction furnace | 12 | 98 | 97 | example |
| condition 3 | 10 | 3.1 | 0.015 | 213 | substantially no problem | part of low Zn dust recycled as sintered ore and remaining dust fed to reduction furnace | 50 | 148 | 97 | example |
| condition 4 | 10 | 0 | 0.008 | 117 | substantially no problem | reduction furnace | 25 | 148 | 97 | example |
| condition 5 | 20 | 1.3 | 0.016 | 214 | substantially no problem | part of low Zn dust recycled as sintered ore and remaining dust fed to reduction furnace | 50 | 204 | 97 | example |
| condition 6 | 20 | 0 | 0.013 | 172 | substantially no problem | reduction furnace | 40 | 204 | 97 | example |
| condition 7 | 30 | 0.5 | 0.019 | 245 | substantially no problem | part of low Zn dust recycled as sintered ore and remaining dust fed to reduction furnace | 54 | 259 | 97 | example |
| condition 8 | 30 | 0 | 0.017 | 228 | substantially no problem | reduction furnace | 50 | 259 | 97 | example |
| condition 9 | 0 | 4.4 | 0.015 | 203 | substantially no problem | high Zn dust used as cement raw material and low Zn dust recycled as sintered ore | — | — | — | comparison example |
| condition 10 | 10 | 4.4 | 0.020 | 259 | descending of charge not good | high Zn dust used as cement raw material and low Zn dust recycled as sintered ore | — | — | — | comparison example |
| condition 11 | 20 | 4.4 | 0.025 | 314 | furnace operation impossible | high Zn dust used as cement raw material and low Zn dust recycled as sintered ore | — | — | — | comparison example |

With respect to the conditions 1, 5, 8 and 11, the flow of zinc in the whole steel works is shown in FIG. 2 to FIG. 5. In FIG. 2 to FIG. 5, numerals described in the drawings indicate zinc amount and a unit of zinc content is number of grams per 1 ton of pig iron (g/t-p).

EXAMPLE

In the production of sintered ore, a use ratio of ore A is set to the conditions 1 to 8, and obtained sintered ores are charged into a blast furnace respectively. In some operations, a portion of dust generated in a blast furnace operation (blast furnace dust) is recycled as a raw material for producing sintered ore. Dust which is not recycled as the raw material for producing sintered ore is reduced and melted using the rotary hearth furnace (described as "reduction furnace" in a column of blast furnace discharge dust treatment method in Table 4) thus obtaining iron pebble and dust. Zinc content in the sintered ore, an amount of zinc charged into the blast furnace and an operation result of the blast furnace in such an operation are also shown in Table 4. Further, a result with respect to an iron recovery ratio in terms of iron pebble in the reduction furnace, zinc concentration of dust generated in the rotary hearth furnace and the zinc recovery amount are also shown in Table 4.

In the operations under the conditions 1 to 8, substantially no problem occurs in a blast furnace operation and pig iron can be produced using iron ore with a high content of zinc. Further, by treating the dust in the blast furnace discharge gas using the rotary hearth furnace, it is possible to recover crude zinc oxide in which iron pebble and zinc are concentrated.

COMPARISON EXAMPLE

In the production of sintered ore, a use ratio of ore A is set to the conditions 9 to 11, and obtained sintered ores are charged into a blast furnace respectively. In the same manner as the conventional operation, out of dust discharged from the blast furnace, the dust with high Zn content (zinc containing ratio: not less than 1 mass %) is used as a cement raw material, and the dust with low Zn content (zinc containing ratio: less than 1 mass %) is recycled as a raw material for sintered ore.

The condition 9 corresponds to a conventional operation condition where iron ore with a high content of zinc is not used. Under conditions 10 and 11, blast furnace charging zinc amount exceeds 250 g per ton of pig iron t so that an amount of zinc charged into the blast furnace is increased whereby descending of charged materials is not favorably carried out thus making the realization of stable operation difficult under the condition 10. Under the condition 11, the bad condition particularly becomes conspicuous so that the operation of the blast furnace is difficult.

Next, a raw material which is produced by mixing zinc containing dust and a zinc-containing fine of steel byproduct is used.

The composition of the used zinc-containing steel fine byproduct is shown in Table 5. Here, dust generated in a converter is used as the zinc-containing fine of steel byproduct.

TABLE 5

|  | T-Fe | FeO | SiO$_2$ | Al$_2$O$_3$ | Zn |
|---|---|---|---|---|---|
| zinc-containing fine of steel byproduct | 48.0 | 16.3 | 1.5 | 1.2 | 1.4 |

Using a facility substantially equal to the facility shown in FIG. 1, an example of producing iron pebble and rotary furnace recovery dust is performed using the zinc containing dust and the zinc-containing fine of steel byproduct under the condition 2. In performing the example, the relationship between the concentration of zinc in the mixed raw material and the concentration of zinc in the recovered dust is investigated. In the investigation, the zinc containing dust and the zinc-containing fine of steel byproduct are used in mixture, the zinc concentration is continuously changed under conditions 12 to 15, and generated dusts are recovered.

Table 6 shows the result of measurement of mixing ratios and zinc concentration of zinc-containing fine of steel byproducts in the mixed raw materials and zinc concentrations of recovered dusts.

TABLE 6

|  | zinc-containing fine of | zinc concentration | | |
|---|---|---|---|---|
| condition | steel byproduct mixing ratio mass % | mixed raw material mass % | recovered dust mass % | remarks |
| 12 | 0 | 0.05 | 12 | example |
| 13 | 10 | 0.19 | 33 | example |
| 14 | 20 | 0.32 | 45 | example |
| 15 | 30 | 0.46 | 54 | example |
| 16 | 40 | 0.59 | 60 | example |

According to Table 6, along with the elevation of mixing ratio of zinc-containing fine of steel byproduct in the mixed raw material, the zinc concentration of the recovered dust is elevated, and when the zinc concentration in the mixed raw material becomes not less than 0.45 mass %, the zinc concentration of recovery dust which is product dust exceeds 50 mass %. It is understood that the recovered dust can be used as a raw material which is directly used in zinc refining such as an IPS method.

As has been described heretofore, with the use of our method, iron ore with a high content of zinc can be used as the pig iron raw material thus effectively making use of iron and zinc contained in the ore with a high content of zinc.

The invention claimed is:

1. A method for producing pig iron comprising the steps of:
    a blast furnace raw material producing step of producing a blast furnace raw material using iron ore with a high content of zinc which contains 0.01 mass % or more of zinc and 50 mass % or more of iron;
    a pig iron producing step of producing pig iron by charging the blast furnace raw material into a blast furnace, and discharging a blast furnace discharge gas which contains zinc-containing dust from a furnace top;
    a dust recovering step of recovering zinc-containing dust in the blast furnace discharge gas; and
    a zinc recovering step of recovering zinc from the zinc-containing dust using a reduction furnace at a temperature of 1450° C. or more.

2. The method according to claim 1, wherein the iron ore with a high content of zinc contains 0.01 to 0.5 mass % of zinc and 50 to 70 mass % of iron.

3. The method according to claim 1, wherein the blast furnace raw material is at least one selected from the group consisting of sintered ore, pellet, lump ore, carbon containing agglomerated ore and ferrocoke.

4. The method according to claim 3, wherein the blast furnace raw material is the sintered ore.

5. The method according to claim 1, wherein the blast furnace raw material producing step comprises producing the blast furnace raw material using the iron ore with a high content of zinc which contains 0.01 mass % or more of zinc and 50 mass % or more of iron and a zinc-containing dust recovered in the dust recovering step.

6. The method according to claim 1, wherein the pig iron producing step comprises producing the pig iron by charging the blast furnace raw material which has a blast furnace charging zinc amount of 250 g or less per 1 ton of pig iron into the blast furnace.

7. The method according to claim 6, wherein the blast furnace charging zinc amount is 60 to 250 g per 1 ton of pig iron.

8. The method according to claim 1, wherein the reduction furnace is one selected from the group consisting of a rotary kiln, a shaft kiln and a movable hearth furnace.

9. The method according to claim 1, wherein the zinc recovering step comprises charging the zinc-containing dust on a hearth of the movable hearth furnace, and reducing the zinc-containing dust by supplying heat from an upper portion of the hearth so as to recover zinc while producing reduced iron.

10. The method according to claim 9, wherein the zinc-containing dust has an average zinc concentration of 0.45 mass % or more.

11. The method according to claim 1, wherein the zinc recovering step comprises charging a mixed raw material which contains zinc-containing dust and a zinc-containing fine of steel byproduct on a hearth of a movable hearth furnace, and reducing the mixed raw material by supplying heat from an upper portion of the hearth to recover crude zinc oxide while producing reduced iron.

12. The method according to claim 11, wherein the zinc-containing fine of steel byproduct is at least one selected from the group consisting of dust generated in a blast furnace, dust generated in a converter, dust generated in an electric furnace, and sludge generated in a surface treatment step of steel plate.

13. The method according to claim 1, wherein the zinc recovering step comprises charging a mixed raw material into which zinc-containing dust, a carbonaceous solid reducing material, and a slag-making material are mixed on a movable hearth, and reducing the mixed raw material by supplying heat from an upper portion of the movable hearth to recover zinc while producing reduced iron.

14. The method according to claim 13, wherein the mixed raw material has an average zinc concentration of 0.45 mass % or more.

15. The method according to claim 1, wherein the zinc recovering step comprises charging a mixed raw material which contains zinc-containing dust, a carbonaceous solid reducing material, and a slag-making material and a zinc-containing fine of steel byproduct on a hearth of a movable hearth furnace, and reducing the mixed raw material by supplying heat from an upper portion of the hearth so as to recover crude zinc oxide while producing reduced iron.

16. The method according to claim 15, wherein the zinc-containing fine of steel byproduct is at least one selected from a group consisting of dust generated in a blast furnace, dust generated in a converter, dust generated in an electric furnace, and sludge generated in a surface treatment step of steel plate.

\* \* \* \* \*